United States Patent [19]

Vassiliades

[11] 3,993,831

[45] *Nov. 23, 1976

[54] MICROCAPSULES, PROCESS FOR THEIR FORMATION AND TRANSFER SHEET RECORD MATERIAL COATED THEREWITH

[75] Inventor: Anthony E. Vassiliades, Deerfield, Ill.

[73] Assignee: Champion International Corporation, Stamford, Conn.

[ * ] Notice: The portion of the term of this patent subsequent to Dec. 24, 1985, has been disclaimed.

[22] Filed: Apr. 8, 1971

[21] Appl. No.: 132,496

Related U.S. Application Data

[63] Continuation-in-part of Ser. No. 784,459, Dec. 17, 1968, abandoned, which is a continuation-in-part of Ser. No. 503,391, Oct. 23, 1965, Pat. No. 3,418,656.

[52] U.S. Cl. ............................... 428/307; 71/64 F; 252/316; 264/4; 424/17; 424/19; 424/32; 426/89; 426/302; 427/151; 427/152; 428/914
[51] Int. Cl.² ...................... B41M 5/00; B01J 13/02
[58] Field of Search .................... 252/316; 264/4; 117/100 A; 424/32; 427/151; 428/307, 914

[56] References Cited
UNITED STATES PATENTS

| | | | |
|---|---|---|---|
| 2,969,331 | 1/1961 | Brynko et al. | 252/316 |
| 3,016,308 | 1/1962 | Macaulay | 252/316 X |
| 3,257,267 | 6/1966 | Hay | 252/316 X |
| 3,418,656 | 12/1968 | Vassiliades | 252/316 |

FOREIGN PATENTS OR APPLICATIONS

| | | | |
|---|---|---|---|
| 929,409 | 6/1963 | United Kingdom | 252/316 |

*Primary Examiner*—Richard D. Lovering
*Attorney, Agent, or Firm*—Roylance, Abrams, Berdo & Kaul

[57] ABSTRACT

Microcapsules containing oily droplets are produced in the absence of coacervation by admixing a partially condensed, formaldehyde condensation product in an aqueous medium and an oil-in-water emulsion, which emulsion comprises water-immiscible oily material as the disperse phase and an aqueous colloidal solution of an amphiphilic emulsifying agent as the dispersion medium. This single admixing effects the separation of the resin from the aqueous medium and precipitation thereof in solid particle form about a nucleus of the oily material, and the resulting microcapsules have a high degree of structural integrity.

19 Claims, 2 Drawing Figures

INVENTOR
ANTHONY E. VASSILIADES

BY Roylance, Abrams, Berdo & Kaul

ATTORNEYS

MICROCAPSULES, PROCESS FOR THEIR FORMATION AND TRANSFER SHEET RECORD MATERIAL COATED THEREWITH

CROSS-REFERENCE TO RELATED APPLICATIONS

This is a continuation-in-part of my copending application for U.S. Pat. application Ser. No. 784,459 filed Dec. 17, 1968, now abandoned, which, in turn, is a continuation-in-part of application Ser. No. 503,391 filed Oct. 23, 1965, now U.S. Pat. No. 3,418,656.

FIELD OF THE INVENTION

This invention relates to the novel microencapsulation of oil-in-water emulsions. More specifically, this invention pertains to the processes for encapsulating minute droplets, the products produced thereby, and the utility thereof in pressure-responsive, transfer-copy systems.

DESCRIPTION OF THE PRIOR ART

For about the last ten years, microcapsules containing both liquid and solid nucleus materials have found widespread acceptance in a variety of commercial applications. For example, one of the most widespread utilities has been in the art of transfer-copy systems wherein minute droplets of a colorless dye intermediate dispersed or dissolved in an oil are encapsulated and coated onto a transfer sheet. The dye intermediate is thereafter transferred to a copy sheet by rupturing said capsules. The underlying copy sheet has an adsorbent coating thereon containing a material which will react with the dye intermediate causing a visible colored mark at points where the microcapsules have been ruptured and the dye transferred. other recent applications in which microcapsules have been used extensively are in adhesives and adhesive tapes, fertilizers, pharmaceuticals, foods and cosmetics.

Soon after the initial developments in microcapsules, several attempts were made to encapsulate minute droplets of an emulsion, either a water-in-oil emulsion or an oil-in-water emulsion. In most of these attempts to date, the "coacervation" phenomenon has been utilized. Microencapsulated emulsions have been used almost exclusively in the pharmaceutical, food and cosmetic industries.

Coacervation is the term applied to the ability of a number of aqueous solutions of colloids, to separate into two liquid layers, one rich in colloid solute and the other poor in colloid solute. Factors which influence this liquid-liquid phase separation are: (a) the colloid concentration, (b) the solvent of the system, (c) the temperature, (d) the addition of another polyelectrolyte, and (e) the addition of a simple electrolyte to the solution.

A unique property of coacervation systems is the fact that the solvent components of the two phases are the same chemical species. This is a major distinguishing characteristic of coacervates as compared to two phase systems involving two immiscible liquids. Thus, a colloidal solute particle migrating across the interface of a two-phase coacervate system finds itself in essentially the same environment on either side of the interface. From the viewpoint of composition, the difference between the two phases is a difference in concentration of solute species. Structurally, the two phases differ in that the colloidal solute of the colloid-poor phase is randomly oriented and the colloidal solute of the coacervate or colloid-rich phase shows a great deal of order. In all cases where coacervation has been observed, the solute species are geometrically anisotropic particles.

Coacervation can be of two general types. The first is called "simple" or "salt" coacervation where liquid phase separation occurs by the addition of a simple electrolyte to a colloidal solution. The second is termed "complex" coacervation where phase separation occurs by the addition of a second colloidal species to a first colloidal solution, the particles of the two dispersed colloids being oppositely charged. Generally, materials capable of exhibiting an electric charge in solution (i.e., materials which possess an ionizable group) are coacervatable. Such materials include natural and synthetic macromolecular species such as gelatin, acacia, tragacanth, styrene-maleic anhydride copolymers, methyl vinyl ether-maleic anhydride copolymers, polymethacrylic acid, and the like.

With both simple and complex coacervate systems, a necessary precondition for coacervation is the reduction of the charge density of the colloidal species. In the case of simple coacervation, this reduction of the charge density along with partial desolvation of the colloidal species is similar to that preceding the flocculation or precipitation of a colloid with the addition of a simple electrolyte since it is known that the addition of more electrolyte to a simple coacervate leads to a shrinking of the colloidal species. This same reduction of charge density along with partial desolvation of the colloidal species which precedes the precipitation of two oppositely charged colloids from solution may also be regarded to be the cause for the phase separation in a complex coacervate system. However, while the reduction of the charge density is a necessary precondition for coacervation, it is oftentimes not sufficient for coacervation. In other words, the reduction of the charge density on the colloidal particles must alter or modify the solute-solute interactions to such an extent that the colloidal particles will tend to aggregate and form a distinct, continuous liquid phase rather than a flocculant or a solid phase. This tendency is attributable to both coulombic and long-range Van der Waal's interactions of large aggregates in solution. Thus in both simple and complex coacervation, two-solution phase formation begins with the colloidal species aggregating to form submicroscopic clusters; these clusters coalesce to form microscopic droplets. Further coalescence produces macroscopic droplets which tend to separate into a continuous phase. This phase appears as a top or bottom layer depending upon the relative densities of the two layers.

If, prior to the initiation of coacervation, an oil-in-water emulsion comprising oil, water and an emulsifying or thickening agent such as carboxymethylcellulose or gum arabic is dispersed as minute droplets in an aqueous solution or sol of an encapsulating colloidal material, and then, a simple electrolyte, such as sodium sulfate, or another, oppositely charged colloidal species is added to induce coacervation, the encapsulating colloidal material forms around each emulsion droplet, thus investing each of said droplets in a liquid coating of the coacervated colloid. The liquid coatings which surround the emulsion droplets must thereafter be hardened in order to produce recoverable solid-walled microcapsules having structural integrity.

One of the primary disadvantages of the coacervation encapsulation techniques is the fact that critical control over the concentrations of the colloidal material and the coacervation initiator must be maintained. That is, coacervation will occur only within a limited range of pH, colloid concentration and/or electrolyte concentration. For example, in simple coacervation, if a deficiency of the electrolyte is added, two-phase formation will not occur whereas, if an excess is added, the colloid will precipitate as a lumpy mass. With complex coacervation systems using a colloid having an isoelectric point, pH is especially important since the pH must be adjusted and maintained at a point where both colloids have opposite charges. In addition, when a gelable colloid, such as gelatin, is used as the encapsulating material, coacervation must take place at a temperature above the gel point of the colloid.

Another disadvantage in the prior art microcapsules, especially those comprising hydrophilic colloids as the encapsulating material, is the fact that such capsules are sensitive to conditions of high relative humidity and temperature. In many cases, this may be desirable, such as in utilities where delayed release of the nucleus material is sought. However, in the art of pressure-responsive, transfer-copy systems, such action would result in a degradation of the capsule walls and a subsequent premature release of the marking fluid.

One common disadvantage experienced with microcapsules containing colorless leuco dye intermediates and produced according to the prior art methods, is the tendency of the dye intermediates to degrade or decompose on prolonged exposure to heat and light. In encapsulated form, these dye intermediates, which are normally dissolved in an oil vehicle, also show an inability to remain in colorless form for extended period of time, especially after they have been coated onto a paper or like web. This inability is considered to be due to atmospheric contamination of the capsule contents by virtue of micropores in the capsule walls.

It is, therefore, an object of this invention to provide a process for the microencapsulation of oil-in-water emulsions which is devoid of the coacervation phenomenon and all of the disadvantages inherent therewith.

it is another object of this invention to provide a process for the production of solid-walled microcapsules having structural integrity without the need for an intermediate liquid wall-hardening step. It is a further object of this invention to provide emulsion-containing microcapsules comprising walls of a hydrophobic resin.

It is yet another object of this invention to provide a pressure-sensitive and responsive transfer sheet record material comprising a coating of microcapsules applied to one side of a web material, said microcapsules containing a colorless, leuco dye intermediate dispersed or dissolved in the oil phase of an oil-in-water emulsion and said microcapsules having superior properties in retaining the dye intermediate in colorless form.

These and other objects and features of this invention will become apparent from the following description of the invention and the accompanying drawings.

The aspects of this invention which are capable of illustration are shown in the accompanying drawings wherein.

Figure 1:
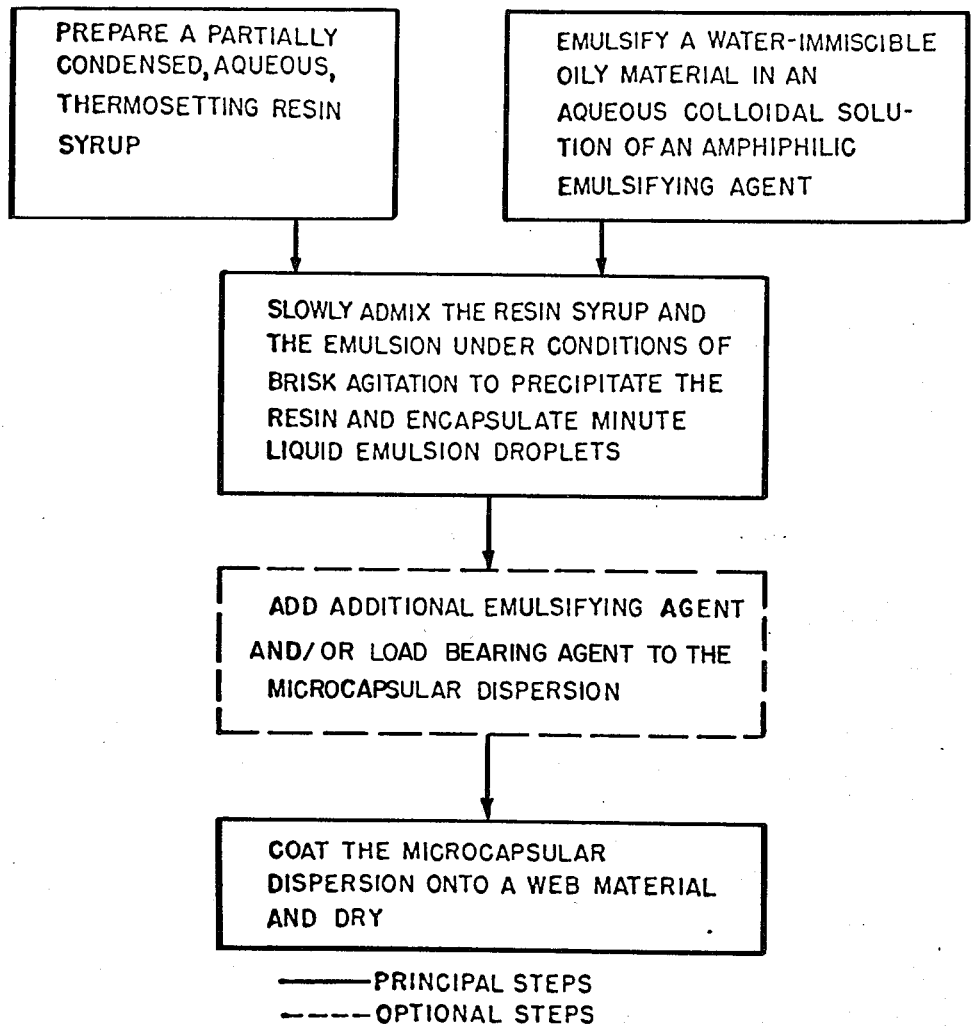
FIG. 1 is a flow diagram which outlines the steps of the encapsulation process of this invention.

According to the present invention, a process is provided for the formation of microcapsules in the absence of coacervation comprising solid walls of a hydrophobic, partially condensed, thermosetting resin and containing minute droplets of an oily material. The process may be described briefly as a simple admixing of:

A. a partially condensed, formaldehyde condensation product in an aqueous medium, e.g. water, said condensation product being capable of being separated from the aqueous medium in solid particle form as a precipitate, upon further dilution with water; and B. an oil-in-water emulsion comprising a water-immiscible oily material selected from the group consisting of liquid and low melting oils, fats and waxes, as the disperse phase and an aqueous, colloidal solution of an amphiphilic emulsifying agent as the dispersion medium, the water of said emulsion being present in a quantity at least sufficient to cause the separation of said condensatiion product from the aqueous medium.

The admixing causes the condensation product to separate from the aqueous medium in solid particle form as a precipitate about a nucleus of oil in water upon dilution with the water of the emulsion. The dilution takes place slowly and under conditions of brisk agitation.

The thermosetting resins which can be used in the process of this invention comprise that broad class of compositions defined as partially condensed formaldehyde condensation products. The term "partially condensed" as employed herein is intended to include resins not having reached the infusible or insoluble stage, e.g. B-stage resins.

Exemplary of suitable resins are the condensation reaction products of formaldehyde with phenols, such as, hydroxybenze (pheriol), m-cresol and 3,5-xylenol; carbamides, such as, urea; triazines, such as, melamine; amino and amido compounds, such as, aniline, p-toluenesulfonamide, ethyleneurea and guanidine; ketones, such as acetone and cyclohexanone; aromatic hydrocarbons, such as naphthalene; and heterocyclic compounds, such as, thiophene. Under the influence of heat, these resins change irreversibly from a fusible and/or soluble material into an infusible and insoluble material.

The preferred formaldehyde condensation products employed in this invention are partially-condensed melamine-formaldehyde, phenol-formaldehyde and urea-formaldehyde resins. The B-stage melamine and urea-formaldehyde resins are especially preferred.

These partially condensed resins can be prepared easily according to conventional practices. For example, a melamine-formaldehyde partial condensate or syrup, which is used in the examples hereinafter presented, is prepared by refluxing 125 grams of melamine in 184 milliliters of formalin (37percent by weight formaldehyde) neutralized to a pH of 8 with sodium carbonate. The mole ratio of formaldehyde to melamine in this reaction mixture is 2.3 to 1. The reaction continues for about 1 to 1½ hours at a temperature between 92° and 96° C. or until 1 volume of the condensate becomes turbid when diluted with 2 to 10 volumes of water. The condensate can be used immediately or can be stored for later use by adding a small amount, about 6 to 15percent by weight, of methanol to the condensate. The methanol prevents any further rapid condensation of the resin solution upon standing and can be evaporated from the syrup either prior to or during the admixing operation.

Similarly, a suitable urea-formaldehyde partial condensate may be prepared by substituting an equivalent molar quantity of urea for the melamine.

The resinous condensate of the present invention may be employed in the form of an aqueous solution, a clear or turbid colloidal dispersion, or a solid suspension of a partially-condensed, highly cross-linkable resin. The aqueous solution, dispersion or suspension of the resin is capable of being diluted with water up to at least twice its volume before any appreciable separation of the resin occurs, i.e., precipitates.

Thus, the condensate as employed in the present invention may be an aqueous solution similar to that produced in the synthesis of the melamine-formaldehyde condensate previously described. Alternatively, the synthesis reaction may be continued beyond the time required to produce a clear solution so that the resulting product is either a clear or turbid dispersion of the condensate in water.

In addition, the aqueous condensate liquid may be prepared having a solids content which may be varied over a wide range, for example, between about 50 and about 80 percent solids. If a high solids-containing aqueous liquid is prepared initially, it may be diluted with water to a lower solids content before utilization in the microencapsulation process. In such instance, the diluted liquid may become turbid.

As previously mentioned, the water of the emulsion is present in a quantity at least sufficient to cause the separation of the condensation product from the aqueous medium. Suitable amounts of water in the emulsion include between about 2 and about 50 volumes, preferably between about 10 and about 40 volumes of water per volume of the partially condensed formaldehyde condensation product.

After precipitation of the resin about the oily nucleus, the condensation reaction continues with time to effect additional cross-linking of the partially condensed material. This additional condensation or cross-linking may be accelerated by the application of heat to the precipitated particles. Thus, microcapsules comprising walls of a thermosetting resin material become harder with the passage of time, and therefore become less pressure sensitive. If desired, an aqueous solution of a chemical cross-linking agent, such as glyoxal, may be added to the microcapsules to cause further hardening of the capsule walls. However, such addition is merely optional and is not necessary to obtain microcapsules having a high degree of structural integrity.

Preferably, a small amount of a stabilizer is added to the thermosetting resin syrup in order to improve the stability of the resin towards heat, light and oxygen. In the processes of this invention, from about 0.3 to 0.5 percent by weight of a conventional stabilizer such as zinc stearate or dibasic lead stearate have been used.

By "water immiscible oily material" is meant lipophilic materials which are preferably liquid, such as oils, which will not mix with water and which are inert with regard to the components of the particular system. Low melting fats and waxes may also be used in this invention. However, oils are the preferred nucleus materials since they do not require temperatture maintenance. In certain embodiments of this invention, the vapor pressure and viscosity of the oily material are to be considered. For example, in the art of making a transfer sheet record material, a low viscosity-low vapor pressure oil is preferred. The viscosity of the oily medium is a determining factor in the speed with which the markings can be transferred to the copy sheet since low viscosity oils will transfer more quickly than oils of higher viscosity. The vapor pressure should be sufficiently low to avoid substantial losses of the oil through evaporation during the encapsulation operation. A compromise should, therefore, be made in selecting an oil of medium viscosity which will have a reasonably low volatility.

In general, the lipophilic nucleus materials can be natural or synthetic oils, fats and waxes or any combination thereof which will meet the requirements of the use for which the microcapsules are intended. Among the materials which can be used are: natural oils, such as cottonseed oil, soybean oil, petroleum lubricating oils, fish liver oils, drying oils and essential oils; synthetic oils, such as methyl salicylate and halogenated biphenyls; low melting fats, such as lard; and liquid or low melting waxes, such as sperm oil and lanolin (wool wax). A preferred class of water immiscible oily materials are the halogenated biphenyls, with chlorinated biphenyl being especially preferred.

Within the scope of the present invention, the herein-disclosed process may be used to encapsulate an oily material alone, or alternatively, the oil phase of the emulsion may serve merely as a vehicle for carrying another active ingredient or material. In this latter utility, the active material may be dissolved, dispersed or suspended in the oil phase. the process of this invention can, therefore, be used to encapsulate medicines, poisons, foods, cosmetics, adhesives or any other material which finds utility in microcapsular form.

In the preferred utility of this invention, viz., transfer sheet record material, the present process may be used to encapsulate an oily printing ink, such as may be used in smudge-proof typewriter ribbons or carbon papers. In such a use, it has been found expedient to encapsulate a colorless, water-insoluble leuco dye intermediate dissolved in the oil phase of the emulsion, thus avoiding the necessity of removing the residual colored matter from the external surfaces of the capsules prior to coating as is required in the encapsulation of printing inks. Colorless leuco dye intermediates are wholly conventional in such utilities and are well known in the art.

Exemplary of the colorless dye intermediates which have been contemplated for use in this invention are leuco dyes, such as crystal violet lactone, benzoyl leuco methylene blue, derivatives of bis(p-dialkylaminoaryl) methane such as disclosed in U.S. Pat. Nos. 2,981,733 and 2,981,738, and mixtures of the foregoing dyes. These dye intermediates are colorless in an alkaline medium and react to form a visible color in an acidic medium. Thus, when a capsule containing such a compound is ruptured and the compound is discharged onto an adsorbant, acidic electron-acceptor material, such as a paper web coated with an organic or an inorganic acid material, a visible color appears on the adsorbant material at the point of contact.

Inhibitors may optionally be dispersed in the oily material along with the dye intermediates. Such materials are helpful in preventing the light and heat degradation of the intermediates during the encapsulation procedure, especially when elevated temperatures are required, such as when a fat is used in the emulsion. Inhibitors are also considered to aid in the stabilization of the colored marking on the copy sheet against the effects of the atmosphere. A small amount (generally about 1 to 10 percent by weight of the dye) of an inhibitor, such as N-phenyl 2-naphthylamine, has been used in the practice of this invention.

The leuco dye intermediates which are mentioned above are, in general, oil-soluble. Oils which are inert with respect to the dye and in which the dye has appreciable solubility, e.g., above 0.5 grams of dye per 100 grams of oil, are preferable.

The emulsions to be encapsulated in the practice of this invention must be stable at least for the duration of the microcapsule formation. Since it is known that oil-water mixtures will not stabilize of their own accord, an emulsifying agent must be incorporated into the system. Selection of the appropriate emulsifier can be based on trial or, preferably, by reference to the hydrophile-lipophile balance (HLB) of the specific materials intended to be used. Based on experimental data, most of the common oils and emulsifiers have ascribed HLB values. Thus, by using these figures, the emulsifier or combination of emulsifiers required to make a stable oil-in-water emulsion can be selected. For example, an emulsifier having an HLB value approximating 10 is necessary to form a stable emulsion of light liquid petrolatum in water. As the HLB of the emulsifier proceeds downwardly to about 4, this oil-in-water emulsion tends to become more unstable and will ultimately invert to a water-in-oil emulsion.

The HLB of blends of two or more emulsifying agents can be calculated by proportion. However, in such combinations, certain antagonisms are evidenced within single classes of emulsifiers. For example, when an aqueous, colloidal dispersion of pigskin gelatin (at lowered pH) and agar is prepared, the gelatin and agar are incompatible. This incompatability can be explained by the phenomenom of coacervation since agar is always negatively charged colloid and gelatin, at a pH below its iso-electric point (which is about pH 9) is highly positive. It follows, therefore, that the gelatin-agar dispersion will be compatible when in an alkaline medium, i.e., when gelatin is above its iso-electric point.

The emulsifying agents to be used in this invention are said to be "amphiphilic." That is, while the emulsifiers are generally preferentially soluble in one phase of the emulsion, they do possess an appreciable affinity for the other phase. It can be said, then, that an amphiphilic emulsifier gives oil a more hydrophilic nature than it had before, and, conversely, gives water a more lipophilic nature. Exemplary of the amphiphilic emulsifying agents which can be used in the instant invention are: naturally-occurring, lyophilic colloids including gums, proteins and polysaccharides, such as gum arabic, gum tragacanth, agar, gelatin and starch; and synthetic materials such as methyl cellulose, polyvinyl pyrrolidone, polyvinyl alcohol and copolymers of methyl vinyl ether and maleic anhydride. A preferred emulsifying agent is methyl cellulose.

Brisk agitation is required in order to obtain very small droplets of the emulsion, and, ultimately, very small capsules. Thus, microcapsules having diameters ranging from about 0.1 to several hundred microns can be produced according to the practices of this invention. Preferably, the microcapsules produced by the process of the present invention have an average particle size of between about 3.5 and about 7 microns, with about 4.5 microns being especially preferred. If the microcapsules are too small, they are difficult to break and the density of the resulting mark in a transfer copy system is reduced. If the microcapsules are too large, premature rupturing occurs and this results in smudging.

Agitation may be achieved by means of a high speed mixer or impeller, by ultrasonic waves or by other conventional means. Brisk agitation need be maintained only in the zone of admixing and not throughout the entire volume of the liquid to which the other liquid is being added.

As can be seen by the attached drawing, a relatively simple encapsulation process is provided using a thermosetting resin encapsulating agent. FIG. 1 shows a process by which an oil-in-water emulsion is encapsulated by a partially condensed, aqueous, thermosetting resin syrup. The resin, in the form of a solution, is admixed slowly with the emulsion. Preferably, the resin solution is added to the emulsion. However, the admixture may involve the addition of the emulsion to the resin solution. In either case, the thermosetting resin separates from its original solution as minute, solid-walled particles having structural integrity by reason of the dilution of the resin solution by the water of the emulsion. Each of the particles contains one or more oil-in-water emulsion droplets.

On completion of the dilution operation, the admixture constitutes the minute resin particles (each containing droplets of the emulsion) evenly dispersed in an aqeuous medium comprising water, the solvent for the resin and residual emulsifying agent. Essentially all of the oily material (in emulsion form) is contained within the resin particles.

The thus-formed microcapsular dispersion may be coated directly onto a web material and dried. As an optional step, a small amount of a binder material, preferably hydroxyethyl cellulose, may be added to the microcapsular dispersion prior to coating. Such addition aids in binding the microcapsules to the web material. If desired, the microcapsules may be admixed with a load bearing agent prior to coating the microcapsules onto the web material. The load bearing agents reduce excessive smudging. Such load bearing agents are conventional in this art and include cellulosic fibers, particulate silica, calcium carbonate, etc.

the microencapsulated emulsions of this invention are intended to be used in the manufacture of transfer sheet record material. More specifically, capsules containing a leuco dye intermediate in the oil phase of the emulsion are to be coated onto one side of a web material and dried. The coating operation is performed by conventional means, such as by use of an air knife. However, in certain embodiments of this invention, the capsules have been successfully roller coated with only very minimal rupture of the capsules. The capsuple coatings, are dried by conventional means at temperatues ranging from about 40° to 75° C. At these temperatures, no appreciable degradation of the capsules, and in particular, the leuco dye intermediate, takes place.

The web material commonly used in transfer sheet record material is paper and is, therefore, preferable in the practice of this invention. However, the microcapsules produced by the herein disclosed processes are also capable of being coated onto other materials such as plastic and fabric or textile webs. When using a web material having a high degree of porosity, it is advisable to pre-coat the web with a material which will reduce seepage of the microcapsular coating through the web. Impregnating the web material with polyvinyl alcohol or a butadiene-styrene latex is the conventional practice for producing an essentially impervious substrate.

Generally, there is sufficient residual emulsifying agent remaining in the microcapsular dispersion after separation of the resin and encapsulation of the emulsion that no additional binding agent need be used. Materials such as gelatin and gum arabic have been used conventionally as binding agents. However, it is preferably to add an additional binder such as methyl cellulose or starch to the system. Binders such as these aid in securing the capsules to the web material. If the dispersion is left too viscous for coating by such addition, water may be used for adjustment of the viscosity.

Figure 2:
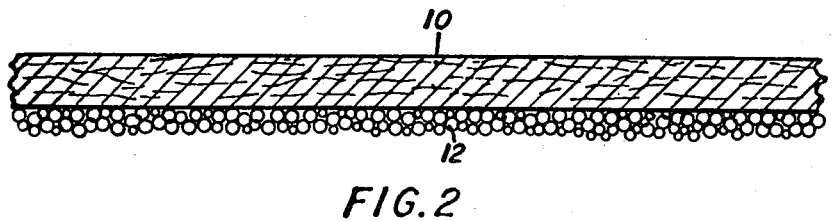
FIG. 2 is a cross-sectional view on an enlarged scale of a portion of a transfer sheet embodying the present invention.

FIG. 2 represents a cross-sectional view of a portion of a transfer sheet record material produced according to the practices of the present invention wherein a paper web material 10 contains a substantially uniform coating of microcapsules 12, each of which contains an oil-in-water emulsion, the oil phase of which contains a colorless leuco dye intermediate. The binding agent used to secure the microcapsular coating to the paper web is not shown.

Transfer sheet made according to the various embodiments of this invention have a pleasant appearance and are almost completely smudge-proof when brought into face-to-face contact with a copy sheet containing a coating of an adsorbant electron-acceptor material. In addition, they show a marked improvement over the transfer sheets presently available in commerce. It has been found that by encapsulating an oil-in-water emulsion, the oil phase of which contains the leuco dye intermediate, the heat and light stability of the dye intermediate, the heat and light stability of the dye intermediate is greatly enhanced. Furthermore, there is less chance of a premature color reaction of the dye intermediate. For example, exposure of the coated papers to direct sunlight for 5 hours, to a temperature of 85° C. for 20 hours, and to a temperature of 70° C. for 18 hours in a 90 percent relative humidity environment does not alter either the pleasant appearance or the transfer and color-forming properties of the paper.

The following examples illustrate various modes of practicing the present invention.

EXAMPLE 1

A water-soluble B-stage urea-formaldehyde resin is prepared by refluxing a mixture comprising 120 grams of urea and 324 grams of formalin (37% by weight aqueous solution of formaldehyde) neutralized to a pH of 7.0 ± 0.1 with a sodium carbonate solution. The aforesaid mixture is then refluxed for about 10 minutes and 0.52 gram of acetic acid is added and heating under reflux is continued for about 3½ hours.

The resultant pH of the mixture is approximately equal to 4.3 and is then adjusted to 7.0 with a sodium carbonate solution. The urea-formaldehyde resin is cooled to room temperature and is in the form of a water-soluble resinous solution.

EXAMPLE 2

Crystal violet lactone and benzoyl leuco methylene blue in an amount of 2.1 parts by weight and 0.9 parts by weight, respectively, are dissolved in 97 parts by weight of a hot chlorinated biphenyl, which is at a temperature of about 100° C. The hot dye solution is agitated for approximately 45 minutes and is then cooled to room temperature. The solution is then filtered through a 5 micron filter to remove any undissolved dye particles.

Meanwhile, methyl cellulose is slowly added to cold water and the mixture is agitated until the methyl cellulose completely dissolves. The agitation is stopped and the solution is permitted to stand overnight so as to eliminate any foam. Three-hundred parts of a 10 percent methyl cellulose (10 centipoises) solution (per 100 parts of oil) in water are transferred to a tank provided with a homomixer. Meanwhile, 100 parts of the dye solution are introduced, slowly, into the tank and are agitated with the homomixer over a period of approximately 5 to 7 minutes. Emulsification is continued until the particle size of the droplets is reduced to an average of about 4 to 5 microns.

Once the desired particle size is obtained, encapsulation is induced by slowly injecting 13 parts by weight of a 60 percent aqueous solution of the B-stage, urea-formaldehyde resin of Example 1 per 100 parts of oil into the tank, slowly.

Ten grams of hydroxyethyl cellulose (a 5 percent aqeuous solution) are added to the microcapsular solution and the resulting dispersion is coated onto a paper web and is dried at a temperature of about 50° to 60° C.

EXAMPLE 3

A mixture is prepared comprising 3 grams of 1-[bis(p-dimethylaminophenyl)methyl]-pyrrolidine and 97 grams of cottonseed oil. The dye-oil mixture is agitated and is then passed through a filter as before.

Partially hydrolyzed polyvinyl alcohol is added to cold water and agitated to form a solution. Two-hundred fifty parts of the polyvinyl alcohol solution per 100 parts of oil are introduced into a tank containing an agitator. Meanwhile, 100 parts of the dye solution are introduced into the tank over a 10 minute period. Emulsification is continued until the particle size of the resulting droplets is about 6 to 7 microns. Next, 17 parts of the urea-formaldehyde resin solution employed in Example 2 are introduced, slowly, into the mixing vessel with brisk agitation. Microcapsules having structural integrity are immediately formed having capsule walls comprising urea-formaldehyde.

A slurry is prepared comprising 10 parts of cellulosic pulp in 50 parts of a 5 percent aqueous hydroxyethyl cellulose solution. The resultant slurry is added to the microcapsular solution and the dispersion is coated onto a paper web.

EXAMPLE 4

Three parts of the dye mixture of Example 2 are dissolved in 97 parts of cottonseed oil and the resulting dye solution is slowly added to 275 parts of a 10 percent by weight polyvinyl pyrrolidone solution in water. The mixture is agitated until the particle size of the droplets is about 5 microns.

Next, 22 parts of a 60 percent solution of the B-stage urea-formaldehyde resin of the previous Example are slowly added to the emulsion with brisk agitation. Solid-walled microcapsules are immediately formed. Next, 5 parts of a 50 percent by weight solution of glyoxal in water are added to the preformed capsules for the purpose of crosslinking the capsule walls. The temperature of the dispersion of microcapsules is raised to about 60° C. and is maintained at that level for about 15 hours.

Hydroxyethyl cellulose is added to the microcapsules as a binder and the resulting dispersion is coated onto a paper web.

EXAMPLE 5

Fifty millimeters of chlorinated biphenyl containing 4 grams of 1-[bis(dimethylaminophenyl)methyl]-pyrrolidine are slowly added to 300 milliliters of a 10 percent by weight methyl cellulose solution in water. Brisk agitation is conducted as before and the particle size of the droplets is reduced to an average of about 4 microns.

Encapsulation is induced by slowly adding 26 parts of a 60 percent aqueous solution of melamine-formaldehyde resin which is in a partially condensed form. As a result of the dilution of the melamine by the aqueous medium in the emulsion, the melamine-formaldehyde resin encapsulates the emulsion droplets forming microcapsules having solid walls. Twelve parts of pulp fibers in 50 parts of 5 percent aqueous hydroxymethyl cellulose solution are added to the dispersion of microcapsules and the resulting slurry is coated onto a paper web.

EXAMPLE 6

Three parts of 1-[bis(p-dimethylaminophenyl)methyl]-benzotriazole are dissolved in 97 parts of a hot chlorinated biphenyl. The dye mixture is slowly added to 275 parts of a 10 percent by weight gum tragacanth solution in water. Emulsification is effected by brisk agitation until the droplets are reduced to the desired particle size. Next, 17 parts of a B-stage phenol-formaldehyde resin syrup are added, slowly, to the emulsion with brisk agitation. Microcapsules having structural integrity are produced and are coated onto a paper web and dried.

EXAMPLE 7

The process of Example 6 is repeated, except that an A-stage phenol-formaldehyde resin is employed. The dispersion of microcapsules is coated onto a paper web, which is dried as before, and a high quality microcapsular coating is obtained.

EXAMPLE 8

An emulsion is prepared by mixing 50 milliliters of cottonseed oil containing 3 grams of 1-[bis(p-dimethylaminophenyl]methyl]-pyrrolidine dye with 50 grams of gum arabic and 100 milliliters of water containing 0.075 gram-equivalents of sodium carbonate. To this emulsion, 25 milliliters of an aqueous melamine-formaldehyde syrup are slowly added with brisk agitation. As a result of the dilution of the syrup by the aqueous medium of the emulsion, the melamine-formaldehyde resin separates from its own aqueous medium, thus encapsulating the emulsion droplets.

The melamine-formaldehyde microcapsules, which remain dispersed in the viscous emulsion medium are then coated onto a paper web and dried at about 50° to 60° C.

Although the invention has been described in considerable detail with particular reference to certain preferred embodiments thereof, variations and modifications can be effected within the spirit and scope of the invention as described hereinafter, and as defined in the appended claims.

What is claimed is:

1. A process for the formation of microcapsules in the absence of coacervation, the capsule walls of which comprise an essentially impermeable precipitate of a hydrophobic, partially condensed, thermosetting resin, said microcapsules containing minute droplets of an oily material, said process comprising admixing:
    A. a partially condensed, formaldehyde condensation product in an aqueous medium, said condensation product being capable of being separated from the aqueous medium in solid particle form as a precipitate, upon dilution with water; and
    B. an oil-in-water emulsion comprising a water-immiscible oily material selected from the group consisting of liquid and low melting oils, fats, and waxes, as the disperse phase and an aqueous, colloidal solution of an amphiphilic emulsifying agent as the dispersion medium, the water of said emulsion being present in a quantity sufficient to cause the separation of said condensation product from the aqueous medium, said admixing causing said condensation product to separate from the aqueous medium in solid particle form as a precipitate about a nucleus of oil-in-water upon dilution with the water of the emulsion, which diluution takes place slowly and under conditions of brisk agitation.

2. A process as defined in claim 1 wherein the water of said emulsion is between about 2 and about 50 volumes of water per volume of said partially condensed formaldehyde condensation product.

3. A process as defined in claim 2 wherein the water of said emulsion is between about 10 and about 40 volumes of water per volume of said partially condensed formaldehyde condensation product.

4. A process as defined in claim 1 wherein said oil-in-water emulsion is admixed with a solid suspension of a partially condensed, formaldehyde condensation product in water.

5. A process as defined in claim 4 wherein said condensation product is a B-stage urea-formaldehyde condensation product.

6. A process as defined in claim 5 wherein said oily material contains a colorless dye intermediate.

7. A pressure-sensitive transfer sheet record material for use in a transfer-copy system having on one side thereof a coating of microcapsules made according to the process of claim 6.

8. A process as defined in claim 1 wherein the oil phase of said oil-in-water emulsion contains therein a colorless dye intermediate.

9. Pressure-rupturable microcapsules made according to the process of claim 1.

10. A process for the formation of microcapsules in the absence of coacervation, the capsule walls of which comprise an essentially impermeable precipitate of a hydrophobic, partially condensed, thermosetting resin, said microcapsules containing minute droplets of an oily material, said process comprising admixing:
    A. a partially condensed melamine formaldehyde condensation product in an aqueous medium, said condensation product being capable of being separated from the aqueous medium in solid particle form as a precipitate, upon dilution with water; and
    B. an oil-in-water emulsion comprising a water immiscible oily material selected from the group consisting of liquid and low melting oils, fats, and waxes, as the disperse phase and an aqueous, colloidal solution of an amphiphilic emulsifying agent as the dispersion medium, the water of said emulsion being present in a quantity sufficient to cause the separation of said condensation product from the aqueous medium, said admixing causing said condensation product to separate from the aqueous medium in solid particle form as a precipitate about a nucleus of oil-in-water upon dilution with the water of the emulsion, which dilution takes place slowly and under conditions of brisk agitation.

11. A process as defined in claim 10, wherein said partially condensed formaldehyde condensation product is a B-stage melamine-formaldehyde condensation product.

12. A process for the formation of microcapsules in the absence of coacervation, the capsule walls of which comprise an essentially impermeable precipitate of a hydrophobic, partially condensed, thermosetting resin, said microcapsules containing minute droplets of an oily material, said process comprising admixing:
  A. a partially condensed phenol-formaldehyde condensation product in an aqueous medium, said condensation product being capable of being separated from the aqueous medium in solid particle form as a precipitate, upon dilution with water; and
  B. an oil-in-water emulsion comprising a water-immiscible oily material selected from the group consisting of liquid and low melting oils, fats, and waxes, as the disperse phase and an aqueous, colloidal solution of an amphiphilic emulsifying agent as the dispersion medium, the water of said emulsion being present in a quantity sufficient to cause the separation of said condensation product from the aqueous medium, said admixing causing said condensation product to separate from the aqueous medium in solid particle form as a precipitate about a nucleus of oil-in-water upon dilution with the water of the emulsion, which dilution takes place slowly and under conditions of brisk agitation.

13. A process for the formation of microcapsules in the absence of coacervation, the capsule walls of which comprise an essentially impermeable precipitate of a hydrophobic, partially condensed, thermosetting resin, said microcapsules containing minute droplets of an oily material, said process comprising admixing:
  A. a partially condensed, formaldehyde condensation product in an aqueous medium, said condensation product being capable of being separated from the aqueous medium in solid particle form as a precipitate, upon dilution with water; and
  B. an oil-in-water emulsion comprising a water-immiscible oily material selected from the group consisting of liquid and low melting oils, fats, and waxes, as the disperse phase and an aqueous, colloidal solution of methyl cellulose as the dispersion medium, the water of said emulsion being present in a quantity sufficient to cause the separation of said condensation product from the aqueous medium, said admixing causing said condensation product to separate from the aqueous medium in solid particle form as a precipitate about a nucleus of oil-in-water upon dilution with the water of the emulsion, which dilution takes place slowly and under conditions of brisk agitation.

14. A process for the formation of microcapsules in the absence of coacervation, the capsule walls of which comprise an essentially impermeable precipitate of a hydrophobic partially condensed, thermosetting resin, said microcapsules containing minute droplets of an oily material, said process comprising admixing:
  A. a B-stage urea-formaldehyde condensation product in an aqueous medium, said condensation product being capable of being separated from the aqueous medium in solid particle form as a precipitate, upon dilution with water; and
  B. an oil-in-water emulsion comprising a water-immiscible oily material selected from the group consisting of liquid and low melting oils, fats, and waxes, as the disperse phase and an aqueous, colloidal solution of methylcellulose as the dispersion medium, the water of said emulsion being present in a quantity sufficient to cause the separation of said condensation product from the aqueous medium, said admixing causing said condensation product to separate from the aqueous medium in solid particle form as a precipitate about a nucleus of oil-in-water upon dilution with the water of the emulsion, which dilution takes place slowly and under conditions of brisk agitation.

15. The process of claim 14, wherein the oil phase of said oil-in-water emulsion contains therein, a colorless dye intermediate.

16. The process of claim 15, wherein said colorless dye intermediate comprises a mixture of crystal violet lactone and benzoyl leuco methylene blue.

17. A process for the formation of microcapsules in the absence of coacervation, the capsule walls of which comprise an essentially impermeable precipitate of a hydrophobic partially condensed, thermosetting resin, said microcapsules containing minute droplets of an oil material, said process comprising admixing:
  A. a partially condensed, formaldehyde condensation product in an aqueous medium, said condensation product being capable of being separated from the aqueous medium in solid particle form as a precipitate, upon dilution with water; and
  B. an oil-in-water emulsion comprising a water-immiscible oily material selected from the group consisting of liquid and low melting oils, fats, and waxes, as the disperse phase and an aqueous, colloidal solution of polyvinyl alcohol as the dispersion medium, the water of said emulsion being present in a quantity sufficient to cause the separation of said condensation product from the aqueous medium, said admixing causing said condensation product to separate from the aqueous medium in solid particle form as a precipitate about a nucleus of oil-in-water upon dilution with the water of the emulsion, which dilution takes place slowly and under conditions of brisk agitation.

18. A process for the formation of microcapsules in the absence of coacervation, the capsule walls of which comprise an essentially impermeable precipitate of a hydrophobic, partially condensed, thermosetting resin, said microcapsules containing minute droplets of an oily material, said process comprising admixing:
  A. a partially condensed, formaldehyde condensation product in an aqueous medium, said condensation product being capable of being separated from the aqueous medium in solid particle form as a precipitate, upon dilution with water; and
  B. an oil-in-water emulsion comprising a water-immiscible oily material selected from the group consisting of liquid and low melting oils, fats, and waxes, as the disperse phase and an aqueous, colloidal solution of starch as the dispersion medium, the water of said emulsion being present in a quantity sufficient to cause the separation of said condensation product from the aqueous medium, said admixing causing said condensation product to separate from the aqueous medium in solid particle form as a precipitate about a nucleus of oil-in-water upon dilution with the water of the emulsion, which dilution takes place slowly and under conditions of brisk agitation.

19. A process for the formation of microcapsules in the absence of coacervation, the capsule walls of which comprise an essentially impermeable precipitate of a hydrophobic, partially condensed, thermosetting resin, said microcapsules containing minute droplets of an oily material, said process comprising admixing:
  A. a partially condensed, formaldehyde condensation product in an aqueous medium, said condensation product being capable of being separated from the aqueous medium in solid particle form as a precipitate, upon dilution with water; and
  B. an oil-in-water emulsion comprising a water-immiscible oily material selected from the group consisting of liquid and low melting oils, fats, and waxes, as the disperse phase and an aqueous, colloidal solution of gelatin as the dispersion medium, the water of said emulsion being present in a quantity sufficient to cause the separation of said condensation product from the aqueous medium, said admixing causing said condensation product to separate from the aqueous medium in solid particle form as a precipitate about a nucleus of oil-in-water upon dilution with the water of the emulsion, which dilution takes place slowly and under conditions of brisk agitation.

* * * * *